United States Patent [19]

Carpenter et al.

[11] Patent Number: 4,982,781

[45] Date of Patent: * Jan. 8, 1991

[54] NO-BAKE PROCESS FOR PREPARING FOUNDRY SHAPES FOR CASTING LOW MELTING METAL CASTINGS

[75] Inventors: William G. Carpenter, Powell; William R. Dunnavant, Columbus, both of Ohio

[73] Assignee: Ashland Oil, Inc., Russell, Ky.

[*] Notice: The portion of the term of this patent subsequent to Aug. 7, 2007 has been disclaimed.

[21] Appl. No.: 308,346

[22] Filed: Feb. 9, 1989

[51] Int. Cl.$^5$ .............................................. B22C 11/22
[52] U.S. Cl. ................................... 164/526; 523/145
[58] Field of Search ...................... 164/525, 526, 527; 523/145, 146, 147; 524/310

[56] References Cited

U.S. PATENT DOCUMENTS

| | | | |
|---|---|---|---|
| 3,904,559 | 9/1975 | Furness et al. | 523/143 |
| 4,079,031 | 3/1978 | Sardessai et al. | 523/143 |
| 4,215,206 | 7/1980 | Hanesworth | 164/527 |
| 4,293,480 | 10/1981 | Martin et al. | 523/456 |
| 4,590,229 | 5/1986 | Gardines | 164/526 |
| 4,600,733 | 7/1986 | Ohashi et al. | 523/146 |
| 4,692,479 | 9/1987 | Schneider | 523/209 |
| 4,698,377 | 10/1987 | Laitar | 164/525 |

FOREIGN PATENT DOCUMENTS

853768 10/1970 Canada .

*Primary Examiner*—Richard K. Seidel
*Attorney, Agent, or Firm*—David L. Hedden

[57] ABSTRACT

This invention relates to a no-bake process for preparing foundry shapes which utilizes polyurethane-forming binders containing selected polyester polyols. The resulting foundry shapes are particularly useful in preparing castings from low melting metals.

15 Claims, No Drawings

NO-BAKE PROCESS FOR PREPARING FOUNDRY SHAPES FOR CASTING LOW MELTING METAL CASTINGS

TECHNICAL FIELD

This invention relates to a no-bake process for preparing foundry shapes which utilizes polyurethane-forming foundry binders containing a polyester polyol. The foundry shapes are particularly useful in preparing castings from low melting metals. When used for this purpose, it has been found that the shakeout properties of the foundry shapes are improved when compared to foundry shapes which were made from binders that did not contain the polyester polyol.

BACKGROUND OF THE INVENTION

In the foundry industry, one of the procedures used for making metal parts is by sand casting. In sand casting, disposable molds and cores are fabricated with a mixture of sand and an organic or inorganic binder. The binder is usually used to strengthen the cores, which are the most fragile part of the mold assembly.

One of the fabrication processes used in sand casting is the no-bake process. In this process a liquid curing agent is mixed with the sand and binder to cure the mixture.

A binder commonly used in the no-bake fabrication process is a polyurethane binder derived from curing a polyurethane-forming binder composition with a liquid tertiary amine catalyst. The polyurethane-forming binder composition usually consists of a phenolic resin component and polyisocyanate hardener component. Such polyurethane-forming binder compositions, used in the no-bake process, have proven satisfactory for casting such metals as iron or steel which are normally cast at temperatures exceeding about 2500 degrees Fahrenheit.

A satisfactory no-bake process which utilizes phenolic resin based polyurethane-forming binders to make foundry shapes used in casting low melting metals has not been developed. This is because the temperature of low melting metals may be as low as about 1300 degrees Fahrenheit during the casting process. This temperature is not high enough to decompose the binder in the sand. Thus, the shakeout of foundry shapes made with traditional polyurethane-forming foundry binders is too slow and/or incomplete.

SUMMARY OF THE INVENTION

This invention relates to a no-bake process for the fabrication of foundry shapes which comprises:
(a) mixing a foundry aggregate with a bonding amount of up to about 10% by weight, based upon the weight of the aggregate, of a binder composition comprising:
  (1) a phenolic resole resin component;
  (2) an effective amount of a polyester polyol;
  (3) a polyisocyanate hardener component; and
  (4) a catalytically effective amount of a liquid tertiary amine catalyst;
(b) introducing the foundry mix obtained from step (a) into a pattern;
(c) allowing the foundry mix to harden in the pattern until it becomes self-supporting; and
(d) thereafter removing the shaped foundry mix of step (c) from the pattern and allowing it to further cure, thereby obtaining a hard, solid, cured foundry shape.

Generally, the polyester polyol and tertiary amine catalyst are part of the phenolic resin component. This process is particularly useful for preparing castings from low melting metals such as aluminum and other low melting non-ferrous metals typically having melting points below 1800 degrees Fahrenheit. The use of binders containing polyester polyols result in foundry shapes which more effectively shakeout of castings made from low melting metals than foundry shapes made from polyurethane-forming binders which do not contain the polyester polyols.

BEST MODE AND OTHER MODES FOR PRACTICING THE INVENTION

The resole phenolic resin component comprises a resole phenolic resin, and preferably a solvent. Generally, the polyester polyol is also part of the resole phenolic resin component. It may also contain various optional ingredients such as adhesion promoters, and release agents.

The resole phenolic resin is prepared by reacting an excess of aldehyde with a phenol in the presence of either an alkaline catalyst or a divalent metal catalyst according to methods well known in the art.

The preferred phenolic resins used to form the subject binder compositions are well known in the art, and are specifically described in U.S. Pat. No. 3,485,797 which is hereby incorporated by reference.

These preferred resins are the reaction products of an aldehyde with a phenol. They contain a preponderance of bridges joining the phenolic nuclei of the polymer which are ortho-ortho benzylic ether bridges. They are prepared by reacting an aldehyde and a phenol in a mole ratio of aldehyde to phenol of at least 1:1 in the presence of a metal ion catalyst, preferably a divalent metal ion such as zinc, lead, manganese, copper, tin, magnesium, cobalt, calcium, and barium.

The phenols may be represented by the following structural formula:

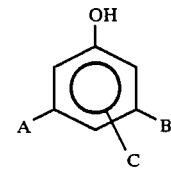

wherein A, B, and C are hydrogen atoms, or hydroxyl radicals, or hydrocarbon radicals or oxyhydrocarbon radicals, or halogen atoms, or combinations of these.

The phenol may be a multiple ring phenol such as bisphenol A. The phenolic resin is preferably non-aqueous. By "non-aqueous" is meant a phenolic resin which contains water in amounts of no more than about 10%, preferably no more than about 1% based on the weight of the resin. The phenolic resin component preferably includes benzylic ether resins.

The aldehyde has the formula R'CHO wherein R' is a hydrogen or hydrocarbon radical of 1 to 8 carbon atoms.

By "phenolic resin" is meant the reaction product of a phenol with an aldehyde in which the final mixture of molecules in the reaction products is dependent upon the specific reactants selected, the starting ratio of these reactants, and the conditions of the reaction (for example, the type of catalyst, the time and temperature of the reaction, the solvents, and/or other ingredients present, and so forth). The reaction products, that is the phenolic resin, will be a mixture of different molecules and may contain in widely varying ratios addition products, condensation products, and unreacted reactants such as unreacted phenol and/or unreacted aldehyde.

By "addition product" is meant reaction products in which an organic group has been substituted for at least one hydrogen of a previously unreacted phenol or of a condensation product.

By "condensation product" is meant reaction products that link two or more aromatic rings.

The phenolic resins are substantially free of water and are organic solvent soluble. The phenolic component includes any one or more of the phenols which have heretofore been employed in the formation of phenolic resins and which are not substituted at either the two ortho-positions or at one ortho-position and the para-position such as unsubstituted positions being necessary for the polymerization reaction. Any one, all, or none of the remaining carbon atoms of the phenol ring ca be substituted. The nature of the substituent can vary widely and it is only necessary that the substituent not interfere in the polymerization of the aldehyde with the phenol at the ortho-position and/or para-position. Substituted phenols employed in the formation of the phenolic resins include alkyl-substituted phenols, aryl-substituted phenols, cyclo-alkyl-substituted phenols, aryloxy-substituted phenols, and halogen-substituted phenols, the foregoing substituents containing from 1 to 26 carbon atoms and preferably from 1 to 12 carbon atoms.

Specific examples of suitable phenols include phenol, 2,6-xylenol, o-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Multiple ring phenols such as bisphenol A are also suitable. Such phenols can be described by the general formula:

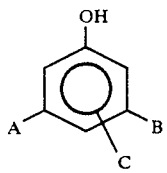

wherein A, B, and C are hydrogen atoms, or hydroxyl radicals, or hydrocarbon radicals, or oxyhydrocarbon radicals, or halogen atoms, or combinations of these.

The phenol reactant is preferably reacted with an aldehyde to form phenolic resins and more preferably benzylic ether resins. The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The phenolic resin used must be liquid or organic solvent-suitable. Solubility in an organic solvent is desirable to achieve uniform distribution of the binder on the aggregate.

The substantial absence of water in the phenolic resin is desirable in view of the reactivity of the binder composition of the present invention with water. Mixtures of phenolic resins can be used.

Alkoxy-modified phenolic resins may also be used as the phenolic resin. These phenolic resins are prepared in essentially the same way as the unmodified phenolic resins previously described except a lower alkyl alcohol is reacted with the phenol and aldehyde or reacted with an unmodified phenolic resin.

The phenolic resin component of the binder composition is, as indicated above, generally employed as a solution in an organic solvent. The nature and the effect of the solvent will be more specifically described later. The amount of solvent used should be sufficient to result in a binder composition permitting uniform coating thereof on the aggregate and uniform reaction of the mixture. The specific solvent concentration for the phenolic resins will vary depending on the type of phenolic resins employed and its molecular weight. In general, the solvent concentration will be in the range of up to 80% by weight of the resin solution and preferably in the range of 20% to 80%. It is preferred to keep the viscosity of the phenolic component at less than X-1 on the Gardner-Holt Scale.

The polyester polyols which are used in the polyurethane-forming foundry binders are well known and prepared by reacting a dicarboxylic acid or anhydride with a glycol. They generally have an average hydroxyl functionality of at least 1.5. The polyester may be a liquid or solid, but must be soluble in the solvents of the polyurethane-forming foundry binder. Preferably, the average molecular weight of the polyester polyol is from 300 to 800. Typical dicarboxylic acids preferably used to prepare the polyester polyols are adipic acid, oxalic acid, and isophthalic acid. The glycols typically used to prepare the polyester polyols are ethylene glycol, diethylene glycol and propylene glycol.

The polyester polyol is used in an effective amount. This is generally in amount sufficient to result in a 80 percent shakeout of the foundry shape, preferably 90 percent shakeout of the foundry shape, used to make the lightweight metal casting, in less than 120 seconds, preferably less than 90 seconds. Generally, this will be from 2 weight percent to 15 weight percent based upon the weight of the phenolic resin component.

The isocyanate hardener component of the binder composition is a polyisocyanate having a functionality of two or more, preferably 2 to 5. It may be aliphatic, cycloaliphatic, aromatic, or a hybrid polyisocyanate. Mixtures of such polyisocyanates may be used. Also, it is contemplated that prepolymers and quasiprepolymers of polyisocyanates can be used. These are formed by reacting excess polyisocyanate with compounds having two or more active hydrogen atoms, as determined by the Zerewitinoff method. Optional ingredients such as a benchlife extender may also be used in the isocyanate hardener component.

Representative examples of polyisocyanates which can be used are aliphatic polyisocyanates such as hexamethylene diisocyanate, alicyclic polyisocyanates such as 4,4'dicyclohexylmethane diisocyanate, and aromatic polyisocyanates such as 2,4 and 2,6-toluene diisocyanate, diphenylmethane diisocyanate, and dimethyl derivates thereof. Other examples of suitable polyisocyanates are 1,5-naphthalene diisocyanate, triphenylmethane triisocyanate, xylylene diisocyanate, and the methyl derivates thereof, polymethylenepolyphenyl isocyanates, chlorophenylene-2,4-diisocyanate, and the like.

The polyisocyanates are used in sufficient concentrations to cause the curing of the phenolic resin in the presence of the liquid amine curing catalyst. In general, the isocyanate ratio of the polyisocyanate to the hydroxyl of the phenolic resin is from 1.25:1 to 1:1.25, preferably about 1:1. Expressed as weight percent, the amount of polyisocyanate used is from 10 to 500 weight percent, preferably 20 to 300 weight percent, based on the weight of the phenolic resin.

The polyisocyanate is used in a liquid form. Solid or viscous polyisocyanate must be used in the form of organic solvent solutions, the solvent generally being present in a range of up to 80 percent by weight of the solution.

Those skilled in the art will know how to select specific solvents for the phenolic resin component and polyisocyanate hardener component. It is known that the difference in the polarity between the polyisocyanate and the phenolic resins restricts the choice of solvents in which both components are compatible. Such compatibility is necessary to achieve complete reaction and curing of the binder compositions of the present invention. Polar solvents of either the protic or aprotic type are good solvents for the phenolic resin, but have limited compatibility with the polyisocyanate. Aromatic solvents, although compatible with the polyisocyanates, are less compatible with the phenolic resins. It is, therefore, preferred to employ combinations of solvents and particularly combinations of aromatic and polar solvents. Suitable aromatic solvents are benzene, toluene, xylene, ethylbenzene, and mixtures thereof. Preferred aromatic solvents are mixed solvents that have an aromatic content of at least 90% and a boiling point range of 138 degrees Celsius to 232 degrees Celsius.

The polar solvents should not be extremely polar such as to become incompatible with the aromatic solvent. Suitable polar solvents are generally those which have been classified in the art as coupling solvents and include furfural, furfuryl alcohol, Cellosolve acetate, butyl Cellosolve, butyl Carbitol, diacetone alcohol, and "Texanol".

In addition, the solvent component can include drying oils such as disclosed in U.S. Pat. No. 4,268,425. Such drying oils include glycerides of fatty acids which contain two or more double bonds whereby oxygen on exposure to air can be absorbed to give peroxides which catalyze the polymerization of the unsaturated portions.

Examples of some natural drying oils include soybean oil, sunflower oil, hemp oil, linseed oil, tung oil, oiticia oil, and fish oils, and dehydrated castor oil, as well as the various known modifications thereof (e.g., the heat bodied, air-blown, or oxygen-blow oils such as blown linseed oil and blown soybean oil). The above discussion concerning the oils is not intended to imply that such actually cure in the present system by air drying, but is intended to help define the drying oils.

Also, esters of ethylenically unsaturated fatty acids such as tall oil esters of polyhydric alcohols such as glycerine or pentaerythritol or monohydric alcohols such as methyl and ethyl alcohols can be employed as the drying oil. If desired, mixtures of drying oils can be employed. The preferred drying oil when employed in the present invention is linseed oil.

The amount of drying oil employed is generally at least about 2%, more generally about 2% to about 15%, and most usually about 4% to about 10% by weight based upon the total of the components in the binder composition.

In addition, the solvent component can include liquid dialkyl esters such as dialkyl phthalate of the type disclosed in U.S. Pat. No. 3,905,934. Such preferably have the structure:

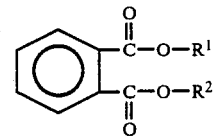

where $R^1$ and $R^2$ are alkyl radicals of 1 to 12 carbon atoms and the total number of carbon atoms in the R groups does not exceed 16. More usually $R^1$ and $R^2$ are alkyl radicals of 3 to 6 carbon atoms and the total number of carbon atoms in $R^1$ and $R^2$ is between 6 and 12. Thus, in the above structural formula either R group can be methyl, ethyl, n-propyl, isopropyl, n-butyl, isobutyl, n-pentyl, isopentyl, hexyl, isohexyl, heptyl, isoheptyl, octyl, isooctyl, and other isomers of the foregoing.

The binder compositions are preferably made available as a two-package system with the phenolic resin, polyester polyol, and liquid amine catalyst in one package and the isocyanate component in the other package. Usually, the binder components are sequentially admixed with sand or a similar aggregate to form the molding mix. Methods of distributing the binder on the aggregate particles are well-known to those skilled in the art. The mix can, optionally, contain other ingredients such as iron oxide, ground flax fibers, wood cereals, pitch, refractory flours, and the like.

When preparing an ordinary sand-type foundry shape, the aggregate employed has a particle size large enough to provide sufficient porosity in the foundry shape to permit escape of volatiles from the shape during the casting operation. The term "ordinary sand-type foundry shapes," as used herein, refers to foundry shapes which have sufficient porosity to permit escape of volatiles from it during the casting operation.

Generally, at least about 80% and preferably about 90% by weight of aggregate employed for foundry shapes has an average particle size no smaller than about 0.1 mm. The aggregate for foundry shapes preferably has an average particle size between about 0.1 mm and about 0.25 mm. The preferred aggregate employed for ordinary foundry shapes is silica wherein at least about 70 weight percent and preferably at least about 85 weight percent of the sand is silica. Other suitable aggregate materials include zircon, olivine, aluminosilicate, sand, chromite sand, and the like.

When preparing a shape for precision casting, the predominant portion and generally at least about 80% of the aggregate has an average particle size no larger than 0.1 mm and preferably between about 0.04 and 0.075 mm. Preferably at least about 90% by weight of the aggregate for precision casting applications has a particle size no larger than 0.1 mm and preferably between 0.04 mm and 0.075 mm. The preferred aggregates employed for precision casting applications are fused quartz, zircon sands, magnesium silicate sands such as olivine, and aluminosilicate sands.

When preparing a refractory such as a ceramic the predominant portion and at least 80 weight percent of the aggregate employed has an average particle size under 0.075 mm and preferably no smaller than 0.04 mm. Preferably at least about 90% by weight of the aggregate for a refractory has an average particle size under 0.075 mm and preferably no smaller than 0.04 mm. The aggregate employed in the preparation of refractories must be capable of withstanding the curing temperatures such as above about 815 degrees Celsius which are needed to cause sintering for utilization. Examples of some suitable aggregate employed for preparing refractories include the ceramics such as refractory oxides, carbides, nitrides, and silicides such as aluminum oxide, lead oxide, chromic oxide, zirconium oxide, silica, silicon carbide, titanium nitride, boron nitride, molybdenum disilicide, and carbonaceous material such as graphite. Mixtures of the aggregate can also be used, when desired, including mixtures of metals and ceramics.

Examples of some abrasive grains for preparing abrasive articles include aluminum oxide, silicon carbide, boron carbide, corundum, garnet, emery, and mixtures thereof. These abrasive materials and their uses for particular jobs are understood by persons skilled in the art and are not altered in the abrasive articles contemplated by the present invention. In addition, inorganic filler can be employed along with the abrasive grit in preparing abrasive articles. It is preferred that at least about 85% of the inorganic fillers has an average particle size no greater than 0.075 mm. It is most preferred that at least about 95% of the inorganic filler has an average particle size no greater than 0.075 mm. Some inorganic fillers include cryolite, fluorospar, silica, and the like. When an inorganic filler is employed along with the abrasive grit, it is generally present in amounts from about 1% to about 30% by weight based upon the combined weight of the abrasive grit and inorganic filler.

Although the aggregate employed is preferably dry, it can contain small amounts of moisture, such as up to about 0.3% by weight or even higher based on the weight of the aggregate.

In molding compositions, the aggregate constitutes the major constituent and the binder constitutes a relatively minor amount. In ordinary sand type foundry applications, the amount of binder is generally no greater than about 10% by weight and frequently within the range of about 0.5% to about 7% by weight based upon the weight of the aggregate. Most often, the binder content ranges from about 0.6% to about 5% by weight based upon the weight of the aggregate in ordinary sand-type foundry shapes.

In molds and cores for precision casting applications, the amount of binder is generally no greater than about 40% by weight and frequently within the range of about 5% to about 20% by weight based upon the weight of the aggregate.

In refractories, the amount of binder is generally no greater than about 40% by weight and frequently within the range of about 5% to about 20% by weight based upon the weight of the aggregate.

In abrasive articles, the amount of binder is generally no greater than about 25% by weight and frequently within the range of about 5% to about 15% by weight based upon the weight of the abrasive material or grit.

Although the aggregate employed is preferably dry, moisture of up to about 1 weight percent based on the weight of the sand can be tolerated. This is particularly true if the solvent employed is non-water-miscible or if an excess of the polyisocyanate necessary for curing is employed since such excess polyisocyanate will react with the water.

The liquid amine catalyst employed in the compositions of the present invention is a base having a $pK_b$ value in the range of about 7 to about 11. The $pK_b$ value is the negative logarithm of the dissociation constant of the base and is a well-known measure of the basicity of a basic material. The higher this number is, the weaker the base. The bases falling within this range are generally organic compounds containing one or more nitrogen atoms. Preferred materials are heterocyclic compounds containing at least one nitrogen atom in the ring structure. Specific examples of bases which have $pK_b$ values within the necessary range include 4-alkyl pyridines wherein the alkyl group has from one to four carbon atoms, isoquinoline, arylpyridines such as phenyl pyridine, pyridine, acridine, 2-methoxypyridine, pyridazine, 3-chloro pyridine, quinoline, N-methyl imidazole, 4,4-dipyridine, phenylpropyl pyridine, 1-methylbenzimidazole, and 1,4-thiazine.

In view of the varying catalytic activity and varying catalytic effect desired, catalyst concentrations will vary widely. In general the lower the $pK_b$ value is, the shorter will be the bench life of the composition and the faster, more complete will be the cure. Solvents and any acidity present in added ingredients such as sand may affect the catalytic activity. In general, however, catalyst concentrations will range from 0.01 to 10 percent by weight of the phenolic resin.

A valuable additive to the binder compositions of the present invention in certain types of sand is a silane such as those having the general formula:

wherein R' is a hydrocarbon radical and preferably an alkyl radical of 1 to 6 carbon atoms and R is an alkyl radical, an alkoxy-substituted alkyl radical, or an alkylamine-substituted alkyl radical in which the alkyl groups have from 1 to 6 carbon atoms. The aforesaid silane, when employed in concentrations of 0.1% to 2%, based on the phenolic binder and hardener, improves the humidity resistance of the system.

Examples of some commercially available silanes are Dow Corning Z6040 and Union Carbide A-187 (gamma glycidoxy propyltrimethoxy silane); Union Carbide A-1100 (gamma aminopropyltriethoxy silane); Union Carbide A-1120 (N-beta(aminoethyl)-gamma-aminopropyltrimethoxy silane); and Union Carbide A-1160 (Ureido-silane).

EXAMPLES

The examples which follow will illustrate specific embodiments of the invention. These examples along with the written description will enable one skilled in the art to practice the invention. It is contemplated that many equivalent embodiments of the invention will be operable besides these specifically disclosed. In all of the examples the foundry samples are cured by the no-bake process by using a twenty-five percent solution of 4-phenylpropylpyrixdine dissolved in HiSol 10 as the catalyst. The catalyst is added to the resin component (RC) before the isocyanate component (IC) is added to the sand. All parts are by weight and all temperatures are in degrees centigrade unless otherwise specified.

The following abbreviations will be used in the examples:

IC-1=isocyanate component, commercially available from Ashland Chemical Company under the trade designation PEP SET ®2600 binder, comprising 73% by weight of polymethylene polyphenyl isocyanate having an average functionality of 2.6 and 27% by weight of an aromatic solvent.

IC-2=isocyanate component, commercially available from Ashland Chemical Company under the trade designation PEP SET ®2610 binder, comprising 73% by weight of a polymethylene polyphenyl isocyanate having an average functionality of 2.9 and 27% by weight of an aromatic solvent.

RC-1=phenolic resin component, commercially available from Ashland Chemical Company under the trade designation PEP SET ®1505 binder, comprising about 60% by weight of a phenolic resole benzylic ether resin such as that described in U.S. Pat. No. 3,485,797 and 40% by weight of a mixture comprising an aromatic solvent and an ester solvent.

RC-2=phenolic resin component, commercially available from Ashland Chemical Company under the trade designation PEP SET ®630 binder, comprising about 60% by weight of a phenolic resole benzylic ether resin such as that described in U.S. Pat. No. 3,485,797 and 40% by weight of a mixture comprising dibasic ester and aromatic solvent.

PE-1=a polyester polyol having an OH value of 225, prepared by reacting diethylene glycol with adipic acid and sold commercially by Witco Chemical Company as FORMREZ ®11-225.

PE-2=a polyester polyol, having an OH value of 150 prepared by reacting tetramethylene glycol and neopentyl glycol with adipic acid and sold commercially by Witco Chemical Company as FORMREZ ®G45-150.

PE-3=a polyester polyol having an OH value of 225 prepared by reacting neopentyl glycol with adipic acid and sold commercially by Witco Chemical Company as FORMREZ ®55-225.

PE-4=a polyester polyol having an OH value of 312 prepared by reacting hexane diol with adipic acid and sold commercially by Witco Chemical Company as FORMREZ ®102.

CONTROLS

Controls A and B do not contain a polyester polyol. Control A utilized IC-1 and RC-1 while Control B utilized IC-2 and RC-2. A sand mix was prepared by mixing 100 parts by weight of Manley 1L-5W sand with about 0.825 part of RC and 0.3 percent by weight of the catalyst solution previously mentioned (said weight percent being based upon the weight of RC). To this mixture was added about 0.675 part of IC.

A core assembly was then prepared from the sand mix to use in the "shakeout test" described by W. L. Tordoff et al. in *AFS Transactions*, "Test Casting Evaluation of Chemical Binder Systems", Vol. 80-74, p. 157-158 (1980), which is hereby incorporated by reference.

According to this article, the measurements required to calculate percent shakeout are the initial core weight, the combined casting and retained core weight after vibration or tumbling, and the combined casting and core weight before vibration or tumbling. Shakeout percentage can be calculated by the following formula:

$$\% \text{ Shakeout} = \frac{(A - B)}{C} \cdot 100$$

where
A=casting and core weight before vibration,
B=casting and retained core weight after vibration, and
C=initial core weight.

The core assembly described in the article is shaped to house molten aluminum (1300 degrees Fahrenheit) which will result in a 7 inch disk after cooling. The aluminum is poured into a sprue which leads to a gate which empties into the core assembly. After the aluminum has cooled and the disk has been formed, the sand from the core assembly is shaken out using a pneumatic vibrator.

The vibrator is clamped to the disk section of the casting midway between the disk circumference and the core center opening. The casting is positioned horizontally so as to facilitate the flow of the sand core from the casting. The casting is vibrated for intervals of fifteen seconds and the cumulative percentage of core weight removed is plotted versus time. The procedure is repeated with each test core and the data are compared to establish which core exhibits a faster rate of core removal.

EXAMPLES 1-8

Examples 1-8 utilized various polyester polyols. The same general procedure set forth in describing the control was followed. The results of tests with various types and amounts of polyester polyol is described in TABLE I.

TABLE I

| Example | Polyester Polyol | Amount (pbw based on RC) | % Shakeout | | | | | | | |
|---|---|---|---|---|---|---|---|---|---|---|
| | | | 15" | 30" | 45" | 60" | 90" | 120" | 150" | 180" |
| Control A | — | — | 14 | 15 | 18 | 20 | 30 | 38 | 62 | 78 |
| 1 | PE-4 | 7 | 9 | 11 | 13 | 15 | 36 | 70 | 93 | |
| 2 | PE-4 | 15 | 19 | 21 | 26 | 30 | 83 | 98 | | |
| 3 | PE-3 | 7 | 13 | 18 | 21 | 24 | 32 | 46 | 90 | 98 |
| 4 | PE-3 | 15 | 27 | 33 | 43 | 60 | 86 | 94 | 99 | |
| 5 | PE-2 | 7 | 10 | 16 | 19 | 22 | 39 | 48 | 88 | 97 |
| 6 | PE-2 | 15 | 18 | 22 | 25 | 28 | 41 | 65 | 92 | 100 |
| Control B | — | — | 12 | 20 | 26 | 32 | 67 | 87 | 98 | |
| 7 | PE-1 | 4 | 7 | 27 | 38 | 56 | 99 | | | |
| 8 | PE-1 | 7 | 26 | 34 | 40 | 47 | 100 | | | |

The data in the table indicate that shakeout was improved when a polyester polyol was used in the binder formulation.

We claim:

1. A no-bake process for the fabrication of foundry shapes which comprises:
   (a) mixing a foundry aggregate with a bonding amount of up to about 10% by weight, based upon the weight of the aggregate, of a binder composition comprising:
      (1) a phenolic resole resin component comprising:
         (a) a phenolic resole resin prepared by reacting formaldehyde with a phenol in a molar ratio of formaldehyde to phenol of at least 1.0 and in the presence of a divalent metal catalyst, such that the resulting resin contains polymeric structures having a preponderance of bridges joining the phenolic nuclei of the polymer which are ortho-ortho benzylic ether bridges;
         (b) an effective amount of a polyester polyol; and
         (c) a solvent in which the phenolic resole resin is soluble, and such that the solvent is present in an amount of from 20 to 80 weight percent based upon the weight of the phenolic resole resin; and
      (2) a polyisocyanate hardener component; and
      (3) a catalytically effective amount of a liquid tertiary amine catalyst;
   (b) introducing the foundry mix obtained rom step (a) into a pattern;
   (c) allowing the foundry mix to harden in the pattern until it becomes self-supporting; and
   (d) thereafter removing the shaped foundry mix of step (c) from the pattern and allowing it to further cure, thereby obtaining a hard, solid, cured foundry shape.

2. The process of claim 1 wherein the phenolic resole resin component, polyester polyol, and liquid tertiary amine catalyst are mixed with the aggregate prior to mixing the polyisocyanate hardener component with the sand.

3. The process of claim 2 wherein the binder composition is about 0.6 to 5.0 weight percent based upon the weight of the aggregate.

4. The process of claim 3 wherein the phenol used to prepare the phenolic resin component of the polyurethane-forming binder composition is selected from the group consisting of phenol, o-cresol, m-cresol, and mixtures thereof.

5. The process of claim 4 wherein the polyester polyol component of the polyurethane-forming binder composition is a liquid and has an average molecular weight of 300 to 800.

6. The process of claim 5 wherein the polyester polyol component of the polyurethane-forming binder composition is used in an amount 2.0 to 8.0 weight percent based upon the weight of the phenolic resin component.

7. The process of claim 6 wherein the polyurethane-forming binder composition has a ratio of hydroxyl groups of the phenolic resin to isocyanate groups of the polyisocyanate of from about 1.25:1.00 to 1.00:1.25.

8. The process of claim 7 wherein the phenolic resin component of the polyurethane-forming composition contains a solvent in which the phenolic resin is soluble.

9. A process of casting a low melting metal which comprises:
   (a) fabricating a shape in accordance with claim 2;
   (b) pouring said low melting metal while in the liquid state into and around said shape;
   (c) allowing said low melting metal to cool and solidify; and
   (d) then separating the molded article.

10. The process of claim 9 wherein the binder composition is about 0.6 to 5.0 weight percent based upon the weight of the aggregate.

11. The process of claim 9 wherein the phenol used to prepare the phenolic resin component of the polyurethane-forming binder composition is selected from the group consisting of phenol, o-cresol, m-cresol, and mixtures thereof.

12. The process of claim 9 wherein the polyester polyol component of the polyurethane-forming binder composition is a liquid and has an average molecular weight of 300 to 800.

13. The process of claim 9 wherein the polyester polyol component of the polyurethane-forming binder composition is used in an amount 2.0 to 15.0 weight percent based upon the weight of the phenolic resin component.

14. The process of claim 9 wherein the polyurethane-forming binder composition has a ratio of hydroxyl groups of the phenolic resin to isocyanate groups of the polyisocyanate of from about 1.25:1.00 to 1.00:1.25.

15. The process of claim 9 wherein the phenolic resin component of the polyurethane-forming composition contains a solvent in which the phenolic resin is soluble.

* * * * *